US008268378B2

(12) United States Patent
Durand et al.

(10) Patent No.: US 8,268,378 B2
(45) Date of Patent: Sep. 18, 2012

(54) METHOD OF PREPARING A POWDERED PRODUCT

(75) Inventors: Daniel Durand, Le Chambon Feugerolles (FR); Jean-Marie Bouvier, Saint-Etienne (FR); Gilles Maller, Saint Marcellin en Forez (FR); Maxwell Scott, Berwick (AU); Stewart Robert Stevenson, Matakohe (NZ); Steven James Roberts, Raumati South (NZ)

(73) Assignee: Clextral, Firminy (FR)

( * ) Notice: Subject to any disclaimer, the term of this patent is extended or adjusted under 35 U.S.C. 154(b) by 1261 days.

(21) Appl. No.: 11/575,717

(22) PCT Filed: Sep. 22, 2005

(86) PCT No.: PCT/FR2005/002361
§ 371 (c)(1),
(2), (4) Date: Feb. 5, 2008

(87) PCT Pub. No.: WO2006/032797
PCT Pub. Date: Mar. 30, 2006

(65) Prior Publication Data
US 2008/0241337 A1 Oct. 2, 2008

(30) Foreign Application Priority Data

Sep. 22, 2004 (FR) .................................. 04 10025
Sep. 15, 2005 (FR) .................................. 05 09450

(51) Int. Cl.
*A23C 9/16* (2006.01)

(52) U.S. Cl. ......... 426/588; 426/465; 426/443; 426/590

(58) Field of Classification Search .................. 426/588, 426/580, 465, 317, 583, 640, 554, 590, 443
See application file for complete search history.

(56) References Cited

U.S. PATENT DOCUMENTS

| 185,198 | A | | 4/1932 | Scott |
| 2,126,807 | A | | 8/1938 | Peebles |
| 2,979,408 | A | | 4/1961 | Greenfield |
| 3,072,486 | A | * | 1/1963 | Oakes et al. .................. 426/317 |
| 3,874,090 | A | | 4/1975 | McCracken et al. |

(Continued)

FOREIGN PATENT DOCUMENTS

CH 86 838 10/1920

(Continued)

*Primary Examiner* — Drew Becker
*Assistant Examiner* — Preston Smith
(74) *Attorney, Agent, or Firm* — Connolly Bove Lodge & Hutz LLP

(57) ABSTRACT

The invention relates to a method for the continuous production of a powdered product from a product in the liquid state in the form of a solution-, suspension- or emulsion-type mixture in an aqueous medium. According to the invention, during the first step (E1) of the method, the product in the liquid state is transformed into a product in the viscous state. The invention is characterised in that it includes at least one over-run step (E2, E4) and at least one product-drying step (E3, E6) comprising at least a first step (E3) involving thermomechanical treatment with at last one thermomechanical treatment machine into which the viscous state product and a determined amount of powered product from the same family as the liquid state product are injected simultaneously. The treatment machine is configured to mix the viscous state product and the powdered product such as to produce solidified particles of the product upon contact with the ambient air.

24 Claims, 5 Drawing Sheets

U.S. PATENT DOCUMENTS

| | | |
|---|---|---|
| 4,305,969 A | 12/1981 | Munk et al. |
| 4,318,773 A | 3/1982 | Ullrich et al. |
| 4,546,226 A | 10/1985 | Trembley et al. |
| 5,596,815 A * | 1/1997 | Rice et al. .................. 34/346 |
| 6,048,565 A | 4/2000 | Getler et al. |

FOREIGN PATENT DOCUMENTS

| | | |
|---|---|---|
| EP | 0 169 106 | 1/1986 |
| GB | 09002 | 0/1903 |
| WO | 97 34503 | 9/1977 |
| WO | 01 52666 | 7/2001 |

* cited by examiner

METHOD OF PREPARING A POWDERED PRODUCT

CROSS REFERENCE TO RELATED APPLICATIONS

This application is the National Stage of International Application No. PCT/FR2005/002361 filed on Sep. 22, 2005; and this application claims priority of Application No. 05 09450 filed in France on Sep. 15, 2005 under 35 U.S.C. §119, and Application No. 04 10025 filed in France on Sep. 22, 2004 under 35 U.S.C. §119; the entire contents of all are hereby incorporated by reference.

BACKGROUND OF THE INVENTION

The present invention relates to a method for the continuous preparation of a powdered product from a product in the liquid state in the form of a solution-, suspension- or emulsion-type mixture in an aqueous medium.

The invention relates, in particular, to a method for the continuous preparation of powdered milk from liquid milk and to a powdered milk obtained by such a method.

Conventionally, powdered milk is obtained industrially by carrying out various operations for obtaining, from liquid milk generally having a dry matter concentration of approximately 12%, a powdered milk having a dry matter concentration of approximately 96 to 98% without adversely affecting the nutritional and functional properties of the milk. Owing to the heat sensitivity of milk, the operation necessitates special drying conditions which are, in particular, the application of a low temperature during the liquid milk evaporation and concentration operations and recourse to short residence times during the passage from the liquid state to the solid state.

In addition, the resultant powdered milk has to meet strict criteria in terms of functional and usage properties such as density, porosity, wettability, complete and instantaneous rehydratability.

Up until now, the drying of milk has involved a plurality of successive operations, namely:
  vacuum evaporation of the milk in the liquid state having an initial dry matter concentration of approximately 12% in order to obtain a dry matter concentration of between 50 and 60%;
  spray drying of the milk issuing from the preceding operation and in which the milk is atomised into very fine droplets which are placed in direct contact with hot air. This operation produces powdered milk of which the dry matter content is approximately 92%;
  final drying in a fluidised bed to achieve the final dry matter content of approximately 96 to 98%; and
  milling and sieving to calibrate the milk powder prior to the packaging thereof This method of producing powdered milk, used up until now, has drawbacks.

Spray drying is expensive, in particular, in terms of investment and power consumption. The power consumption is approximately 2.6 to 2.8 kg of steam and 0.8 kW per kg of evaporated water, making this operation by far the greatest power consumer of the entire method, with approximately 70% of the thermal power and approximately 40% of the electrical power.

In addition, even if spray drying can be applied to differing milk compositions, including powdered milk substitutes, this method does not permit the treatment of liquid milk which is enriched with vaporisable ingredients such as flavourings, for example, which would be eliminated during drying, so the development and production of new products such as vitaminised milk or flavoured milk, for example, by spray drying cannot be considered.

Moreover, the document U.S. Pat. No. 5,596,815 which constitutes the closest prior art discloses a process for drying raw material having a substantial proportion of moisture and in which the raw material is transferred into a mixer with a predetermined proportion of a relatively dry material. The material is then transferred into a pelletiser, then a drier. A proportion of the material obtained is transferred into a cooler and into a mill, and the milled material is recycled into the mixer.

However, the main drawback of this method is that the resultant product does not have the required functional and usage properties and does not achieve the qualities of the products obtained by conventional methods as it has a high density and excessively low porosity and solubility.

It is accordingly the object of the invention to propose a method for the continuous production of a powdered product from a product in the liquid state which enables the aforementioned drawbacks to be avoided.

BRIEF DESCRIPTION OF PREFERRED EMBODIMENTS

The invention accordingly relates to a method for the continuous production of a powdered product from a product in the liquid state in the form of a solution-, suspension- or emulsion-type mixture in an aqueous medium, in which, during a first step the product in the liquid state is transformed into a product in the viscous state, characterised in that there are carried out at least one overrun step and at least one drying step comprising at least a first thermomechanical treatment step with at least one thermomechanical treatment machine into which the viscous state product and a determined amount of powdered product from the same family as the liquid state product are injected simultaneously, the treatment machine being configured to mix the viscous state product and the powdered product so as to produce solidified particles of product upon contact with the ambient air.

According to particular embodiments, the method comprises one or more of the following features, taken individually or in any technically feasible combinations:
  in addition to the first thermomechanical treatment step, the drying step comprises a second step for drying the particles obtained after this thermomechanical treatment step,
  between the thermomechanical treatment step and the second drying step, a step of shaping the solid product is carried out in order to obtain the powdered product,
  said step of overrun of the product in the viscous state is carried out before the thermomechanical treatment step,
  said overrun step is carried out between the thermomechanical treatment step and the step of shaping the solid product,
  a step of overrun of the product in the viscous state is carried out before the thermomechanical treatment step and an overrun step is carried out between said thermomechanical treatment step and the solid product shaping step,
  a gas is injected during said overrun step or during the thermomechanical treatment step or during the overrun step and during the thermomechanical treatment step,
  all of the powdered product injected into said thermomechanical treatment machine is product which has been recycled after the second drying step, some of the powdered product injected into said thermomechanical treatment machine is powdered product which has been recycled after the second drying step, degassing under atmospheric pressure or under vacuum is carried out during the thermomechanical treatment step, after transformation of the product from the liquid state to the viscous state, the product in the viscous state has a dry matter concentration of between 50 and 75%, preferably between 65 and 75%, after the step of drying the product in the viscous state, the solid form product has a dry matter concentration of approximately 96 to 98%, after the thermomechanical treatment step, the particles have a dry matter concentration varying between 70 and 85% and preferably of between 80 and 85%, the ratio between the mass flow rate of powdered product injected into the thermomechanical treatment machine and the mass flow rate of product in the viscous state introduced into the thermomechanical treatment machine is between 0.10 and 2.50 and preferably between 0.20 and 1.00, the step of thermomechanical treatment of the product in the viscous state is carried out by introducing the product in the viscous state and the powdered product into an extruder having two co-rotating screws, the thermomechanical treatment step is carried out by introducing the product in the viscous state and the powdered product into a blender or a kneader, or a mixer and/or a single screw extruder, the product in the liquid state initially has a dry matter concentration of between 7 and 20%, the product in the liquid state is liquid milk, from which powdered milk is obtained, the product in the liquid state is a native or (physically or chemically) modified starch product based on cereal (wheat, oat, maize, barley, etc.) flour, potato flour, potato granules, potato flakes and/or tapioca flour, the product initially being in the form of a solution-, suspension- or emulsion-type mixture in an aqueous medium, from which the product is obtained in powdered form after the method, the product in the liquid state is a native or (physically and/or chemically) modified protein product selected from milk casein, wheat gluten, maize zein, soya proteins, legume, in particular pea, proteins and/or oil and protein seed crop (in particular sunflower or rape) proteins, the product initially being in the form of a solution-, suspension- or emulsion-type mixture in an aqueous medium, from which the product is obtained in powdered form after the method, the product in the liquid state is a co-product/by-product of milk fractionation obtained by fractionation of the milk by centrifugation, filtration, nanofiltration, ultrafiltration and/or reverse osmosis, and the powdered product injected into the thermomechanical treatment machine has a dry matter content of approximately 90 to 96% in the case of the products of starch and protein origin and approximately 90% in the case of products of milk origin.

The invention also relates to the powdered milk obtained by a method as defined hereinbefore.

BRIEF DESCRIPTION OF THE SEVERAL VIEWS OF THE DRAWINGS

Further features and advantages of the invention will emerge during the following description, given with reference to the accompanying drawings, in which.

DETAILED DESCRIPTION OF PREFERRED EMBODIMENTS

Figure 1:
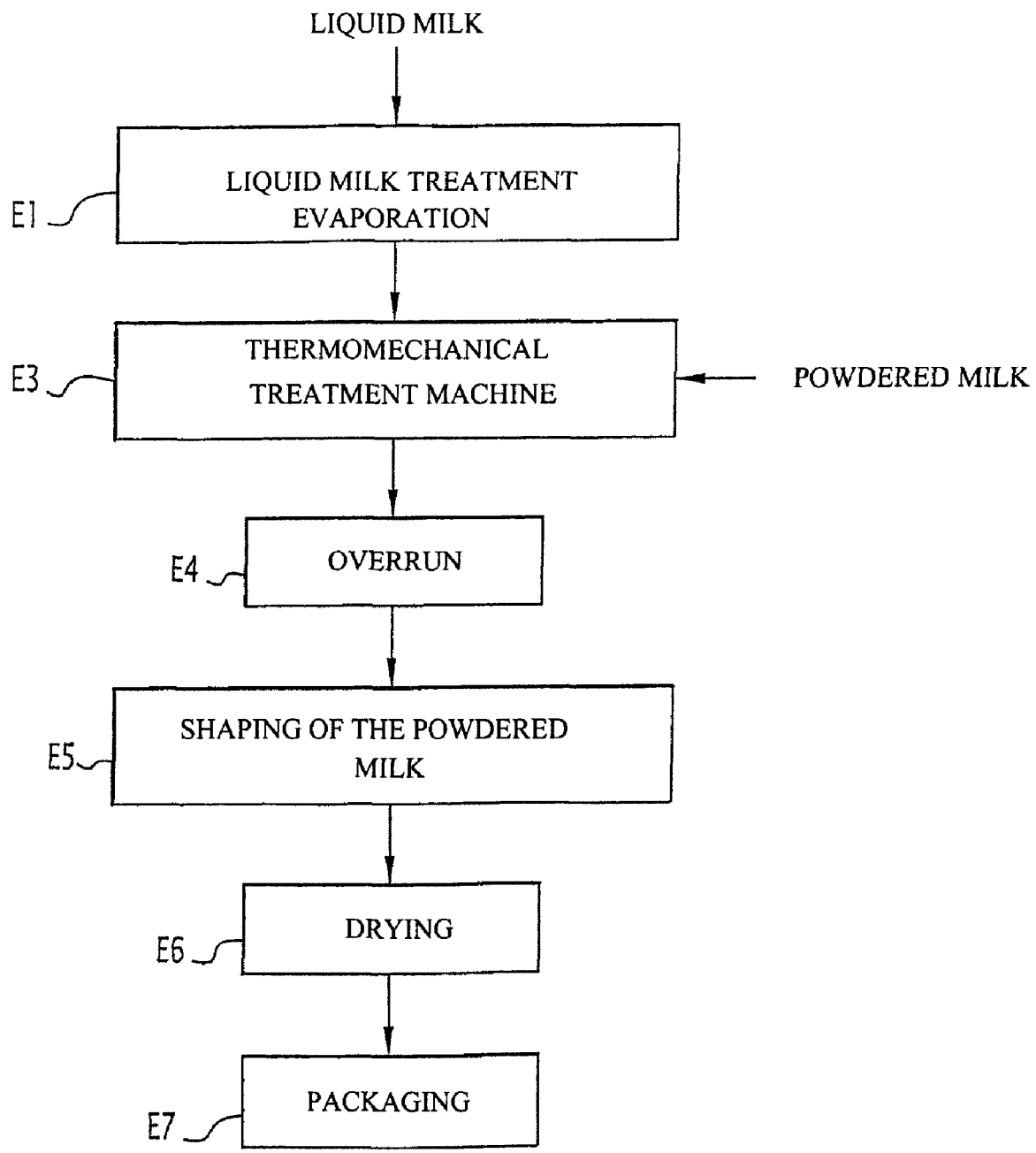
FIG. 1 is a flowchart showing the steps of a first embodiment of a method for producing powdered milk according to the invention.
Figure 2:
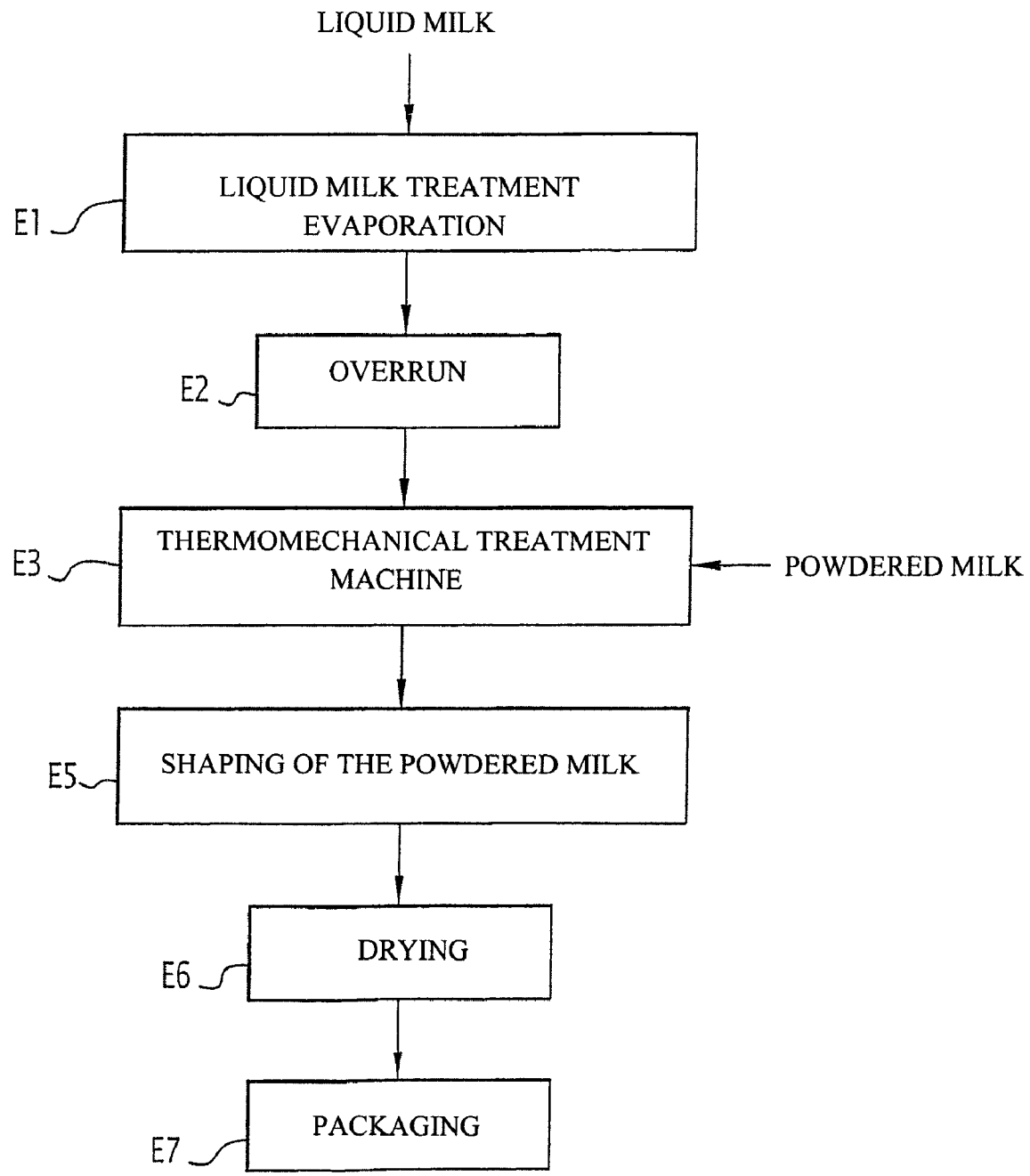
FIG. 2 is a flowchart showing the differing steps of a second embodiment of a method for producing powdered milk according to the invention.
Figure 3:
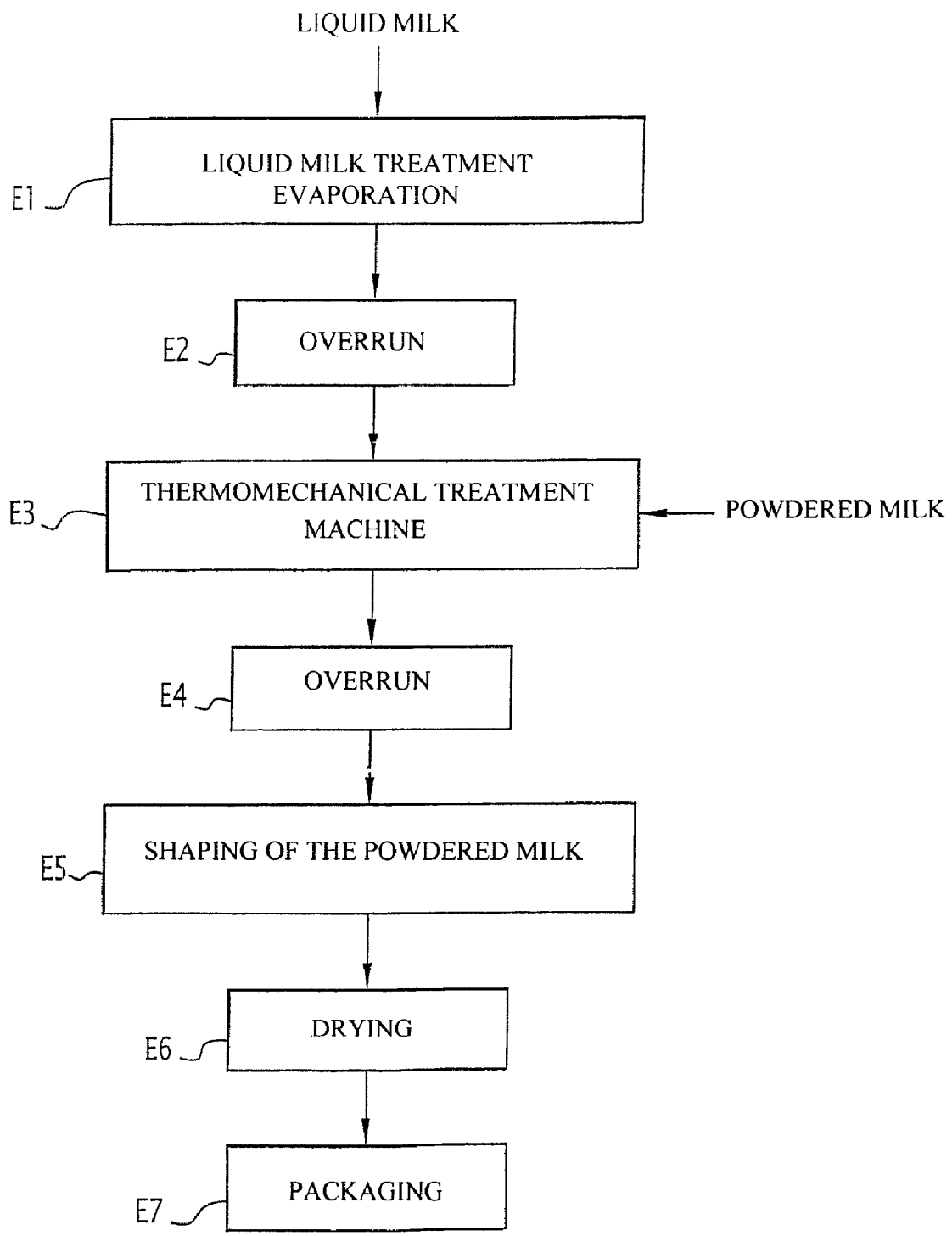
FIG. 3 is a flowchart showing the differing steps of a third embodiment of a method for producing powdered milk according to the invention.

As shown in the flowcharts in FIG. 1 to 3, liquid milk generally having a dry matter concentration of between 7 and 20% is initially treated during a first evaporation step E1 to obtain a milk in the viscous state having a dry matter concentration of between 50 and 75% and preferably between 65 and 75%. Conventionally, the liquid milk is, for example, brought to the boil at an elevated temperature of less than 100° C. and at a pressure which is less than atmospheric pressure during this step E1. This evaporation under vacuum prevents deterioration of the milk.

After this first step of treatment, the milk in the viscous state is subjected to at least one drying step and, preferably in the method according to the invention, two drying steps E3 and E6 and, between these two drying steps, a step E5 of shaping the solid milk to obtain the powdered milk having a dry matter concentration of approximately 96 to 98% after the second drying step E6.

The drying step comprises a first step E3 of plasticisation/concentration of the milk carried out in a thermomechanical treatment machine such as, for example, an extruder with two co-rotating, co-penetrating screws of a known type.

The thermomechanical treatment machine comprises a zone for simultaneous introduction, on the one hand, of the milk in the viscous state originating from evaporation step E1 and, on the other hand, from a predetermined proportion of powdered milk containing approximately 96 to 98% of dry matter.

All or some of the powdered milk injected into the thermomechanical treatment machine of step E3 is the powdered milk recycled after the second drying step E6.

The proportion of injected powdered milk, in other words the ratio between the mass flow rate of recycled powdered milk having a dry matter content of approximately 96 to 98% and the mass flow rate of milk in the viscous state, is between 0.10 and 2.50 and preferably between 0.20 and 1.00.

At the outlet of the thermomechanical treatment machine of step E3, the resultant particles having a dry matter concentration of approximately 60 to 85% are subjected to shaping of the powdered milk during step E5, in which the particles are milled and sieved in order to obtain a powdered milk.

After this step E5, the particles are subjected, during step E6, to final drying in order to obtain a product having a dry matter concentration of approximately 96 to 98%.

The use of an extruder as the thermomechanical treatment machine enables thermal mechanical plasticisation/mixing work to be carried out on the milk paste, allowing, in particular, the mixing, blending, shearing and heating of the milk paste in order ultimately to arrive at a homogeneous milk paste.

The extrusion machine has the advantage of allowing continuous treatment.

In a variation, other machines allowing thermomechanical treatment of the milk paste are used during the first drying step E3.

Machines of this type are, for example, a mixer, a blender or a kneader and include, by way of example, paddle mixers comprising paddles which are rotated round a single axis, screw mixers in which a plurality of screws are rotated in a tank, viscous fluid mixers such as scraped surface mixers, and blenders.

In a further variation, an extruder comprising a single screw is used to carry out the thermomechanical treatment step.

Preferably, a degassing step is carried out in the thermomechanical treatment machine of step E3. Degassing is almost instantaneous egress of water contained in the product, this evaporation being brought about by a sudden drop in pressure, and allowing the water to change state from the liquid phase to the vapour phase. The rapid drop in the pressure of the product or milk is obtained, depending on the initial pressure of the product or the milk, by rapidly bringing it to atmospheric pressure, if the product or the milk is at a pressure higher than atmospheric, or by a vacuum or a low pressure.

During degassing, the temperature of the portion of the milk paste remaining in liquid form in the thermomechanical treatment machine is lowered.

The method according to the invention comprises at least one product overrun step.

According to a first embodiment shown in FIG. 1, the overrun step E4 is carried out between the thermomechanical treatment machine of step E3 and the powdered milk shaping step E5.

According to a second embodiment shown in FIG. 2, the overrun step E2 is carried out on the viscous product between the evaporation step E1 and the thermomechanical treatment machine of step E3.

According to third embodiment shown in FIG. 3, a first overrun step E2 is carried out on the viscous product between the evaporation step E1 and the thermomechanical treatment machine of step E3, and a second overrun step E4 is carried out between the thermomechanical treatment machine of this step E3 and the powdered milk shaping step E5.

This or these overrun steps consist of a homogeneous intimate mixture between the liquid or viscous product and a gas, in order to obtain a homogeneous aerated structure.

Preferably, a gas such as, for example, an inert gas is injected at least during an overrun step E2 or E4. This injection of gas can be carried out solely during an overrun step or simultaneously during an overrun step and in the thermomechanical treatment machine. The injection of gas during a step when the milk paste is stirred ultimately leads to a milk paste having an aerated structure. This overrun step is required to obtain the functional and usage properties of the powdered milk such as density, porosity, wettability and complete and instantaneous rehydratability. In addition, the aerated structure of the milk facilitates subsequent drying of the milk paste by substantially increasing the exchange surface area between the milk paste and the ambient medium, and by thus facilitating the transfer of steam.

The milk powder obtained by conventional methods and used up until now has a solubility of 99%, a porosity of between 60 and 65% and a particle density of 0.44.

The Applicant took measurements using a scanning electron microscope in order to determine the characteristics of the internal structure of a milk powder obtained by a method according to the closest state of the art, U.S. Pat. No. 5,596,815 (FIG. 4), and a milk powder obtained by the method of the invention (FIGS. 5A and 5B).

Figure 4:
FIG. 4 is a view of the internal structure of a powdered product obtained by a method according to the closest prior art.
Figure 5A:
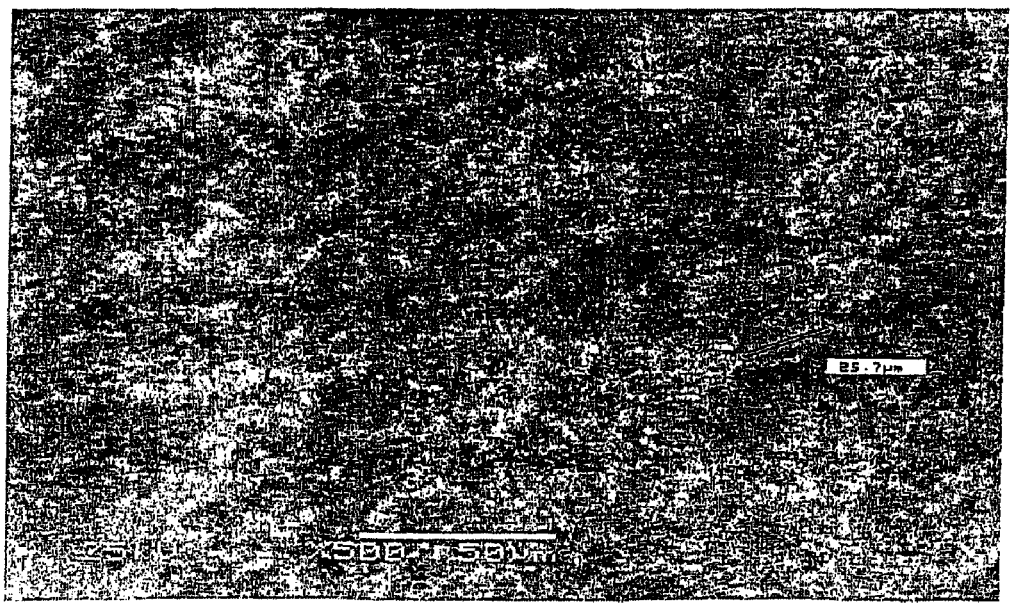
FIGS. 5A and 5B are two views of the internal structure of a powdered product obtained by the method according to the invention, on the same scale as FIG. 4 and on an enlarged scale, respectively.
Figure 5B:
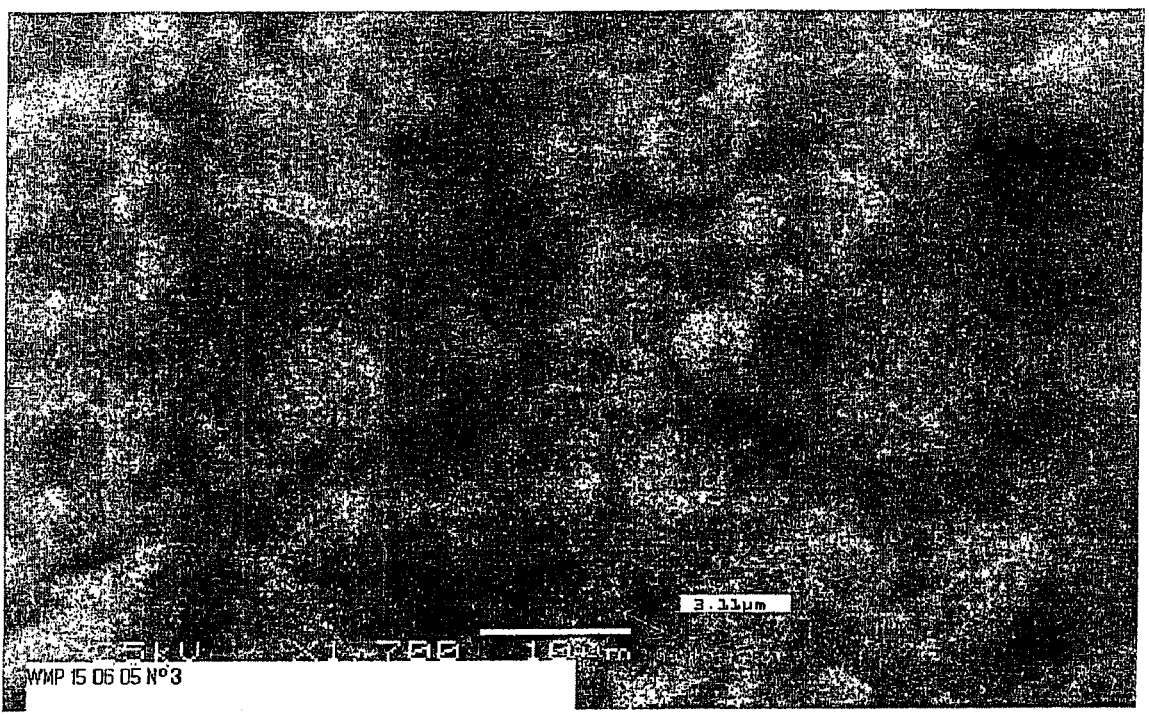

The magnification in FIGS. 4 and 5A is 50 microns whereas it is 10 microns in FIG. 5B.

As shown in these figures, the products obtained have different internal structures, the internal structure of the prior art product (FIG. 4) being coarse with low porosity whereas the internal structure of the product according to the invention (FIGS. 5A and 5B) is homogeneous and has small bubbles trapped in the matter.

The product according to the prior art has the following characteristics:

| | |
|---|---|
| solubility | 90 to 99% |
| porosity | 20 to 25% |
| particle density | 1.3 |

The product according to the invention has the following characteristics:

| | |
|---|---|
| solubility | 98 to 99% |
| porosity | 50 to 70% |
| particle density | 0.3 to 0.5. |

According to a variation, it is also possible to carry out a coating step involving providing the powdered milk with a coating, to improve the properties of the final product. This coating step is carried out, for example, between the second during step E6 and the packaging step E7. The coating step is carried out, for example, by spraying a coating product onto the powdered milk.

Lecithin is a possible coating product.

The method according to the invention can be applied to differing liquid milk compositions having variable fats contents and to powdered milk substitutes. In addition, it allows the treatment of liquid milk supplemented with various ingredients such as flavourings, vitamins or minerals, owing to the excellent miscibility of the thermomechanical treatment machine (extruder, blender, mixer, etc.), and this permits the development and production of powdered milk of different types and therefore with a greater added value.

In the case of powdered milk production, the method according to the invention allows significant energy savings of approximately 40% over the conventional method and a significant reduction in the investment cost. As a comparison, the steam consumption per 100 kg of treated liquid milk is approximately 33 kg with the prior art method whereas it is approximately 19 kg with the method according to the invention, with substantially identical electric power consumption.

In general, the method of the invention can be used, with similar advantages, for the production of powdered products other than powdered milk, based on any type of solution, suspension or emulsion of any different composition comprising dry matter in an aqueous medium.

The method is applicable, for example, to the production of powdered products of the followings types:
  starch products: cereal (wheat, oat, maize, barley) flours, potato flours, potato granules and flakes, tapioca flour. These products may be native, in other words without chemical and/or physical modifications, and merely dried and milled. These products may be physically modified, for example by modification of the crystalline structure of the starches, inter alia by processes of gelatinisation and fusion; they may also be chemically modified, for example by hydrolysis, esterification or etherification;

protein products: milk casein, wheat gluten, maize zein, soya proteins, legume (pea, for example) proteins, oil and protein seed crop (sunflower, rape, for example) proteins. These products may be native, in other words without chemical and/or physical modifications and simply dried and milled. These products may be physically modified, for example by modification of the quaternary, tertiary and secondary structures of the proteins (denaturation process); they may also be chemically modified, for example by hydrolysis, amidation, succinylation, or condensation, in other words by reaction with the functional organic groups: amine, carboxyl, for example.

The method is also applicable to the co-products/by-products of milk fractionation, in other words liquid fractions obtained when the milk is fractionated by methods such as centrifugation, filtration, nanofiltration, ultrafiltration, reverse osmosis, etc., these operations being intended to separate the differing components of the milk (fats, proteins, sugars, etc.).

During thermomechanical treatment step E3, other ingredients such as, for example, cereals, proteins, sugars, cocoa, vitamins, flavourings, etc. may be introduced simultaneously into the powdered product.

The method is also applicable to the production of powdered products for the subsequent preparation, by rehydration, of baby foods: milks which are reconstituted according to the different ages, various slurries, mixtures in pots, etc.

The invention claimed is:

1. Method for the continuous production of a powdered product from a product in the liquid state in the form of a solution-, suspension- or emulsion-type mixture in an aqueous medium, in which, during a first step the liquid state product is transformed into a viscous state product wherein there is carried out at least one product-drying step comprising at least a first thermomechanical treatment step with at least one thermomechanical treatment machine into which the viscous state product and a determined amount of powdered product from the same family as the liquid state product are injected simultaneously, and into which a one or more gases are further injected, the treatment machine being configured to mix the viscous state product and the powdered product so as to produce solidified particles of product upon contact with ambient air, and wherein after the first thermomechanical treatment step, there is carried out at least one overrun step.

2. Method according to claim 1, wherein, in addition to the first thermomechanical treatment step, the drying step comprises a second step for drying the particles obtained after this thermomechanical treatment step.

3. Method according to claim 2 wherein, between the thermomechanical treatment step and the second drying step, a step of shaping the solid product is carried out in order to obtain the powdered product.

4. Method according to claim 3, wherein said overrun step is carried out between the thermomechanical treatment step and the step of shaping the solid product.

5. Method according to claim 4, wherein an additional step of overrun of the viscous state product is carried out before the thermomechanical treatment step.

6. Method according to claim 1, wherein one or more gases are injected during said overrun step.

7. Method according to claim 2, wherein the entire powdered product injected into said thermomechanical treatment machine is product which has been recycled after the second drying step.

8. Method according to claim 2, wherein some of the powdered product injected into said thermomechanical treatment machine is powdered product which has been recycled after the second drying step.

9. Method according to claim 1, wherein degassing under atmospheric pressure or under vacuum is carried out during the thermomechanical treatment step.

10. Method according to claim 1, wherein, after transformation of the liquid state product into the viscous state product, the viscous state product has a dry matter concentration between 65 and 75%.

11. Method according to claim 1, wherein after the step of drying the viscous state product, the product in solid form has a dry matter concentration of approximately 96 to 98%.

12. Method according to claim 1, wherein after the thermomechanical treatment step, the particles have a dry matter concentration between 80 and 85%.

13. Method according to claim 1, wherein the ratio between the mass flow rate of powdered product injected into the thermomechanical treatment machine and the mass flow rate of the viscous state product introduced into the thermomechanical treatment machine is between 0.10 and 2.50.

14. Method according to claim 1, wherein the step of thermomechanical treatment of the viscous state product is carried out by introducing the viscous state product and the powdered product into an extruder having two co-rotating screws.

15. Method according to claim 1, wherein the thermomechanical treatment step is carried out by introducing the viscous state product and the powdered product into a kneader and/or a single screw extruder.

16. Method according to claim 1, wherein ingredients such as, for example, cereals, proteins, sugars, cocoa, vitamins and flavourings are introduced during the thermomechanical treatment step.

17. Method according to claim 1, wherein the liquid state product initially has a dry matter concentration of between 7 and 20%.

18. Method according to claim 1, wherein the liquid state product is liquid milk, from which powdered milk is obtained.

19. Method according to claim 1, wherein the liquid state product is a native or (physically or chemically) modified starch product based on cereal (wheat, oat, maize, barley, etc.) flour, potato flour, potato granules, potato flakes and/or tapioca flour, the product initially being in the form of a solution-, suspension- or emulsion-type mixture in an aqueous medium, from which the product is obtained in powdered form after the method.

20. Method according to claim 1, wherein the liquid state product is a native or (physically and/or chemically) modified protein product selected from milk casein, wheat gluten, maize zein, soya proteins, legume, in particular pea, proteins and/or oil and protein seed crop (in particular sunflower or rape), proteins, the product initially being in the form of a solution-, suspension- or emulsion-type mixture in an aqueous medium, from which the product is obtained in powdered form after the method.

21. Method according to claim 1, wherein the liquid state product is a co-product/by-product of milk fractionation obtained by fractionation of the milk by centrifugation, filtration, nanofiltration, ultrafiltration and/or reverse osmosis.

22. Method according to claim 1, wherein the powdered product injected into the thermomechanical treatment machine has a dry matter content of approximately 90 to 96% in the case of the products of starch and protein origin and approximately 90% in the case of products of milk origin.

23. Method according to claim 1, wherein after transformation of the liquid state product into the viscous product, the viscous state product has a dry matter concentration of between 50 and 75%.

24. Method according to claim 1, wherein after the thermomechanical treatment step, the particles have a dry matter concentration between 70 and 85%.

\* \* \* \* \*